United States Patent
Righi et al.

(10) Patent No.: US 10,262,158 B1
(45) Date of Patent: Apr. 16, 2019

(54) RESTRICTING THE USE OF A FIRMWARE TOOL TO A SPECIFIC PLATFORM

(71) Applicant: American Megatrends, Inc., Norcross, GA (US)

(72) Inventors: Stefano Righi, Lawrenceville, GA (US); Paul Anthony Rhea, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

(21) Appl. No.: 15/661,397

(22) Filed: Jul. 27, 2017

(51) Int. Cl.
   *G06F 21/00* (2013.01)
   *G06F 21/62* (2013.01)
   *H04L 9/32* (2006.01)

(52) U.S. Cl.
   CPC .......... *G06F 21/629* (2013.01); *H04L 9/3247* (2013.01)

(58) Field of Classification Search
   None
   See application file for complete search history.

(56) References Cited

U.S. PATENT DOCUMENTS

| 6,826,690 | B1 * | 11/2004 | Hind | G06F 21/31 |
| | | | | 713/173 |
| 7,558,804 | B1 * | 7/2009 | Polydov | G06F 9/445 |
| 2003/0097587 | A1 * | 5/2003 | Gulick | G06F 21/575 |
| | | | | 726/34 |
| 2003/0188173 | A1 * | 10/2003 | Zimmer | G06F 12/1458 |
| | | | | 713/189 |
| 2005/0071833 | A1 * | 3/2005 | Rothman | G06F 9/4401 |
| | | | | 717/153 |
| 2006/0184794 | A1 * | 8/2006 | Desselle | G06F 21/575 |
| | | | | 713/166 |
| 2012/0124357 | A1 * | 5/2012 | Zimmer | G06F 1/3203 |
| | | | | 713/2 |

(Continued)

OTHER PUBLICATIONS

Whitney, L., Windows 8 moves to BIOS-based product keys, CNet.com, Nov. 27, 2012, https://www.cnet.com/news/windows-8-moves-to-bios-based-product-keys/ (4 pages).

(Continued)

*Primary Examiner* — Maung T Lwin
(74) *Attorney, Agent, or Firm* — Newport IP, LLC Shigeta | Hope

(57) ABSTRACT

A firmware includes a firmware module for copying a digitally signed binary file that includes a firmware globally unique identifier (GUID), tool GUIDs, and feature GUIDs to an Advanced Configuration and Power Management interface (ACPI) table (the Firmware Enabled Tool Registry (FETR) table). If the FETR table is stored in memory, a firmware tool determines whether a digital signature of the signed binary file can be verified. If the digital signature can be verified, the firmware tool determines if the firmware GUID stored in the FETR table matches a firmware GUID stored in another ACPI table. If the firmware GUIDs match, the firmware tool determines whether its tool GUID matches a tool GUID stored in the FETR table. The firmware tool can continue to execute if the tool GUIDs match. Firmware tool features are enabled if feature GUIDs in the FETR table match feature GUIDs of the firmware tool.

20 Claims, 7 Drawing Sheets

(56) References Cited

U.S. PATENT DOCUMENTS

| | | | | |
|---|---|---|---|---|
| 2014/0250291 A1* | 9/2014 | Adams | ................... | G06F 21/57 |
| | | | | 713/2 |
| 2016/0364243 A1* | 12/2016 | Puthillathe | ............ | G06F 9/4411 |
| 2016/0378576 A1* | 12/2016 | Jayakumar | .............. | G06F 9/544 |
| | | | | 719/312 |
| 2018/0075242 A1* | 3/2018 | Khatri | ................... | G06F 21/575 |
| 2018/0144117 A1* | 5/2018 | Engler | .................... | G06F 21/44 |

OTHER PUBLICATIONS

Anonymous, Is the windows 10 product key in BIOS? (undated), SuperUser.com, https://superuser.com/questions/1095980/is-the-windows-10-product-key-in-bios (3 pages), (Jul. 2016).

* cited by examiner

RESTRICTING THE USE OF A FIRMWARE TOOL TO A SPECIFIC PLATFORM

BACKGROUND

Firmware tools enable users to modify various aspects of the operation of computer system firmware. Firmware tools might, for example, allow users to change configuration parameters used by a firmware and/or modify other settings utilized to determine how the firmware operates.

Many of the configuration parameters that can be modified using firmware tools can have a negative impact on system performance or security if set incorrectly. Moreover, many configuration parameters that can be set by firmware tools relate to highly complex technical features, thereby increasing the likelihood that an untrained user might incorrectly set the configuration parameters, thereby adversely impacting the performance or security of a computing system, or even rendering the computing system unbootable.

Firmware tools are also not limited for use with specific firmware versions. As a result, a firmware tool configured for use with one firmware version can be utilized with a computing system that utilizes a different firmware version. Utilization of a firmware tool with a firmware version for which it was not intended for use can also result in the incorrect setting of configuration values, thereby negatively impacting the performance or security of a computing system.

It is with respect to these and other considerations that the disclosure made herein is presented.

SUMMARY

Technologies are described herein for restricting the use of firmware tools, and specific features provided by the firmware tools, to specific platforms. Through an implementation of the technologies disclosed herein, a firmware tool, and particular features of the firmware tool, can be restricted for use with a particular computing platform, thereby eliminating the possibility that firmware configuration parameters will be set incorrectly by an incompatible firmware tool or an untrained user. Technical benefits other than those specifically mentioned herein can also be realized through an implementation of the technologies disclosed herein.

In one configuration, a firmware image is created that includes a firmware configured with a feature identifier ("ID") firmware module configured to copy the contents of a digitally signed binary file to an Advanced Configuration and Power Management Interface ("ACPI") table at runtime of the firmware. The digitally signed binary file includes data specifying a firmware globally unique identifier ("GUID"), one or more tool GUIDs, and one or more feature GUIDs. The digitally signed binary file can be stored in an area of the firmware image (referred to herein as a read-only memory ("ROM") hole) which, when changed, will not cause a digital signature of the firmware image to be modified. The firmware image can be utilized to copy, or "flash", the firmware to a non-volatile memory device in a computing system.

At runtime of the firmware (e.g. when the computing system configured with the firmware is booted), the feature ID firmware module is executed. Upon execution, the feature ID firmware module copies the firmware GUID, the tool GUIDs, and the feature GUIDs contained in the signed binary file to an ACPI table (referred to herein as the "Firmware Enabled Tool Registry" or "FETR" table). Another component of the firmware can also copy a firmware GUID contained in the firmware to another ACPI table (referred to herein as the "Firmware ID Table" or "FIDT" table). Following execution of the various firmware components, the computing system can boot an operating system ("OS").

A request can be received to execute a firmware tool on the OS. As discussed above, a firmware tool is a software component that enables users to modify various aspects of the operation of the firmware of a computing system. Firmware tools might, for example, allow users to change configuration parameters used by a firmware and/or modify other settings utilized to determine how the firmware operates.

When the firmware tool begins execution, it determines whether the FETR table is stored in the random access memory ("RAM") of the computing system. Further execution of the firmware tool is blocked if the FETR table is not stored in the RAM of the computing system. If the FETR table is stored in the RAM of the computing system, the firmware tool determines whether the digital signature of the signed binary file can be verified. If the digital signature of the signed binary file cannot be verified, further execution of the firmware tool is blocked.

If the digital signature can be verified, the firmware tool compares the firmware GUID stored in the FETR table to the firmware GUID stored in the FIDT table. If the firmware GUIDs do not match, further execution of the firmware tool is blocked. If the firmware GUIDs match, the firmware tool determines whether its tool GUID matches at least one of the tool GUIDs stored in the FETR table. If the tool GUID of the firmware tool does not match a tool GUID stored in the FETR table, further execution of the firmware tool is blocked. If the tool GUID of the firmware tool matches a tool GUID stored in the FETR table, the firmware tool is permitted to execute.

The mechanism described above can also be utilized to limit execution of certain features of a firmware tool to a particular platform. In order to provide this functionality, the firmware tool can also identify feature GUIDs stored in the FETR table that match feature GUIDs corresponding to features provided by the firmware tool. Only those features having a feature GUID corresponding to a feature GUID in the FETR table will be enabled. All other features of the firmware tool will be disabled.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for restricting the use of firmware tools, and individual features provided by the firmware tools, to specific platforms. As discussed briefly above, through an implementation of the technologies disclosed herein, firmware tools, and individual features provided by the firmware tools, can be restricted to use with specific platforms, thereby eliminating the possibility that firmware configuration parameters will be set incorrectly by an incompatible firmware tool or an untrained user. Additional details regarding these aspects will be provided below with regard to FIGS. 1-6.

It is to be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1:
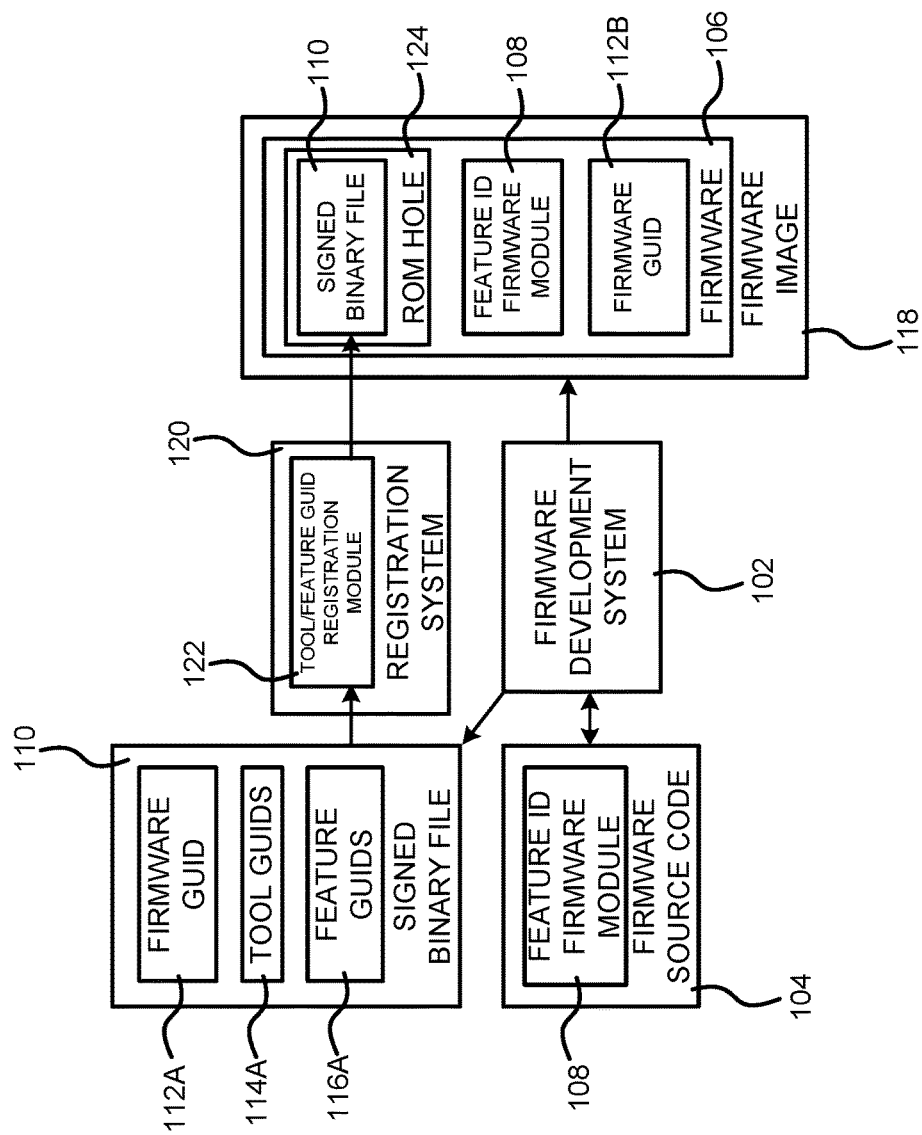
FIG. 1 is a software architecture diagram illustrating aspects of a mechanism for generating a firmware image configured for use in restricting the use of firmware tools, and specific features provided by the firmware tools, to specific platforms, according to one or more configurations presented herein.

FIG. 1 is a software architecture diagram illustrating aspects of a mechanism for generating a firmware image 118 configured for use in restricting the use of firmware tools, and specific features provided by the firmware tools, to specific computing platforms, according to one or more configurations presented herein. As shown in FIG. 1, a firmware development system 102 can be utilized to create firmware source code 104. The firmware development system 102 can include compilers, source code management systems, and/or other systems and components for assisting a software developer with the creation of the firmware source code 104. The firmware source code 104 is source code for implementing a computer system firmware 106. The firmware source code 104 can be expressed using one or more programming languages, such as C, C++, assembly language, and others.

As shown in FIG. 1, the firmware source code 104 also includes source code for a feature ID firmware module 108. As will be described in greater detail below, the feature ID firmware module 108 is a software module that is configured to copy the contents of a digitally signed binary file 110 to an ACPI table at runtime of the firmware 106. As illustrated in FIG. 1, the signed binary file 110 includes data specifying a firmware GUID 112A, one or more tool GUIDs 114A, and one or more feature GUIDs 116A. The firmware GUID 110 is data that uniquely identifies the version of the firmware contained in the firmware image 118. The tool GUIDs 114A include unique data that identifies the firmware tools that are authorized to execute. The feature GUIDs 116A include unique data that identifies the features of the firmware tools that are authorized to execute.

The binary file 110 can be digitally signed, for instance using the private key of a developer of the firmware 106. As shown in FIG. 1, the firmware development system 102 generates the digitally signed binary file 110 in one configuration. Other components can generate the digitally signed binary file 110 in other configurations. As also shown in FIG. 1, the digitally signed binary file 110 can be stored in an area of the firmware image 118 (referred to herein as a read-only memory ("ROM") hole 124) which, when changed, will not cause a digital signature of the firmware image 118 to be modified. As shown in FIG. 1, a registration system 120 is utilized to store the signed binary file 110 in the ROM hole 124 of the firmware image 118 in one configuration. The registration system 120 is a computing system that includes a tool/feature GUID registration module 122. The tool/feature GUID registration module 122 is an executable software component that takes the signed binary file 110 and stores the signed binary file 110 in the ROM hole 124 of the firmware image 118.

As also shown in FIG. 1, the firmware image 118 includes a firmware 106 that includes the executable feature ID firmware module 108 (outside the ROM hole 124) and the signed binary file 110, which is located in the ROM hole 124. The firmware 106 also includes many other executable software components and data not explicitly described herein. The firmware 106 also includes a firmware GUID 112B that uniquely identifies the version of the firmware 106 in the firmware image 118. The firmware image 118 can also be digitally signed, such as with the private key of the software developer creating the firmware 106. Additional details regarding creation of the firmware 106 and the firmware image 118 will be provided below with regard to FIG. 2.

Once the firmware image 118 has been created, the firmware image 118 can be utilized to copy, or "flash", the firmware 106 to a non-volatile memory device in a computing system. At boot time of the firmware 106 (e.g. when the computing system configured with the firmware 106 is booted), the feature ID firmware module 108 is executed. Upon execution, the feature ID firmware module 108 copies the firmware GUID 112A, the tool GUIDs 114A, and the feature GUIDs 116A contained in the signed binary file 110 to an ACPI table (referred to herein as the "FETID" table). Another component of the firmware 106 can also copy the firmware GUID 112B contained in the firmware to another ACPI table (referred to herein as the "FIDT" table). Following execution of the various firmware components, the computing system can boot an operating system ("OS"). The data stored in the ACPI tables can then be utilized to determine if a firmware tool is authorized for execution and, if authorized, which features of the firmware tool are authorized for execution. Additional details regarding this process will be provided below with regard to FIGS. 3 and 4.

It is to be appreciated that the registration process described herein can be performed after a computing system implementing the disclosed technologies has been sold. This is because of the inclusion of the ROM hole at build time of the firmware. The FIDT added at build time can ensure that firmware tools, and individual features provided by the firmware tools, can be restricted to use with specific platforms.

Figure 2:
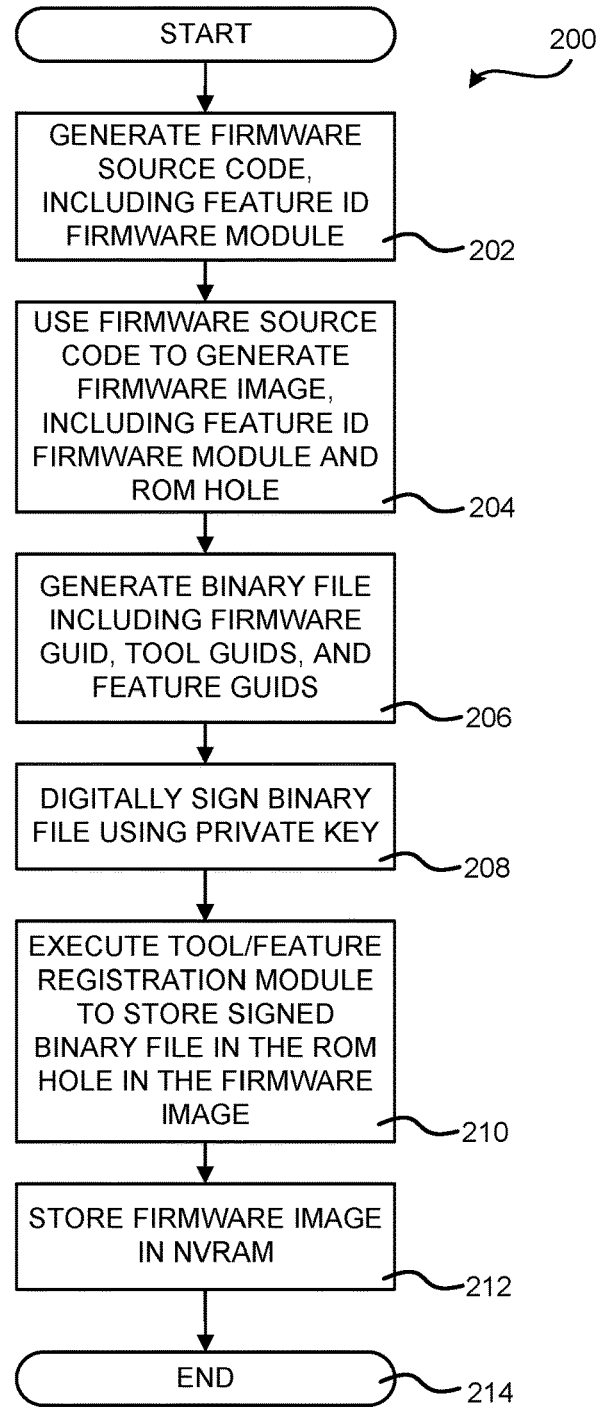
FIG. 2 is a flow diagram illustrating aspects of the mechanism shown in FIG. 1 for generating a firmware image configured for use in restricting the use of firmware tools, and specific features provided by the firmware tools, to specific platforms, according to one configuration presented herein.

FIG. 2 is a flow diagram showing a routine 200 that illustrates aspects of the mechanism shown in FIG. 1 for generating a firmware image 118 configured for use in restricting the use of firmware tools, and particular features provided by the firmware tools, to specific platforms, according to one configuration presented herein. It is to be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The routine 200 begins at operation 202, where the firmware development system 102 can be utilized to generate the firmware source code 104 that includes, among other components, the feature ID firmware module 108. The routine 200 then proceeds from operation 202 to operation 204, where the firmware development system 102 utilizes the firmware source code 104 to generate the firmware image 118, including the feature ID firmware module 108, the firmware GUID 112B, and the ROM hole 124. The routine 200 then proceeds from operation 204 to operation 206.

At operation 206, the firmware development system 102 can be utilized to generate the signed binary file 110. As discussed above, the signed binary file 110 includes the firmware GUID 112A, the tool GUIDS 114A, and the feature GUIDs 116A. The binary file 110 can be digitally signed using the developer's private encryption key at operation 208. It is to be appreciated that the signed binary file 110 can be generated outside of the process described by the routine 200. The routine 200 then proceeds from operation 208 to operation 210.

At operation 210, the tool/feature GUID registration module 122 stores the signed binary file 110 in the ROM hole 124. The routine 200 then proceeds to operation 212, where the firmware image 118 can be stored in a flash ROM, or other type of non-volatile memory device, of a computing system, such as the computing system 302 described below with regard to FIG. 3. The routine 200 then proceeds from operation 212 to operation 214, where it ends.

Figure 3:
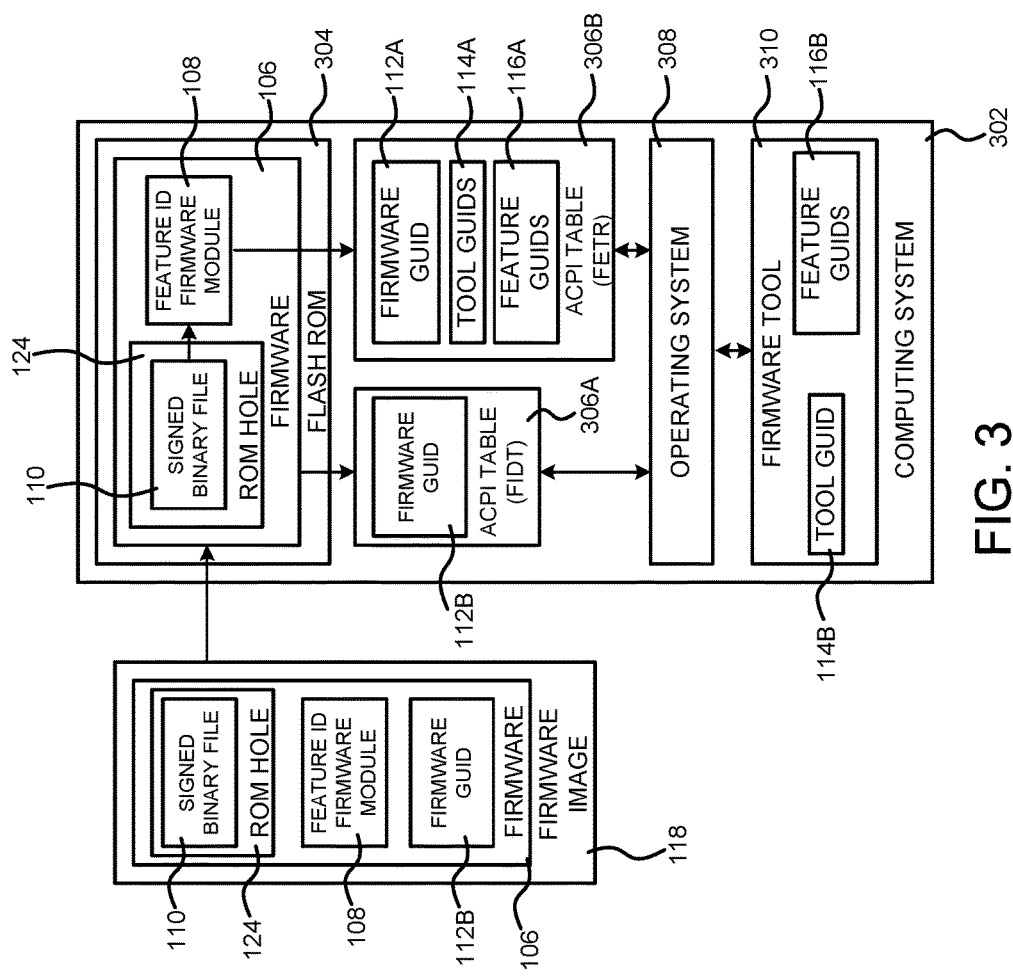
FIG. 3 is a software architecture diagram illustrating aspects of the operation of a mechanism for restricting the use of firmware tools, and specific features provided by the firmware tools, to specific platforms, according to one or more configurations presented herein.

FIG. 3 is a software architecture diagram illustrating aspects of the operation of a mechanism for restricting the use of firmware tools, and specific features provided by the firmware tools, to specific platforms, according to one or more configurations presented herein. As discussed above, the firmware image 118 can be utilized to store the firmware 106 in the flash ROM 304 of a computing system 302. Once the firmware 106 has been stored in the flash ROM 304, the firmware 106 can be executed, such as by turning on the power to the computing system 302.

At runtime of the firmware 106 (e.g. when the computing system 302 configured with the firmware 106 is booted), the components of the firmware 106, including the feature ID firmware module 108, are executed. Upon execution, the feature ID firmware module 108 copies the firmware GUID 112A, the tool GUIDs 114A, and the feature GUIDs 116A contained in the signed binary file 110 in the ROM hole 124 to an ACPI table 306B (the "FETR" table) in RAM. Another component of the firmware 106 can also copy a firmware GUID 112B contained in the firmware 106 to another ACPI table (the "FIDT" table), also in RAM. Following execution of the various firmware components, the computing system can boot an operating system ("OS") 308.

A request can be received to execute a firmware tool 310 on the OS 308. As discussed above, a firmware tool 310 is a software component that enables users to modify various aspects of the operation of the firmware 106 of a computing system 302. Firmware tools 310 might, for example, allow users to change configuration parameters used by the firmware 106 and/or modify other settings utilized to determine how the firmware 106 operates.

When the firmware tool 310 begins execution, it determines whether the FETR table 306B is stored in the RAM of the computing system 302. Further execution of the firmware tool 310 is blocked if the FETR table 306B is not stored in the RAM of the computing system 302. If the FETR table 306B is stored in the RAM of the computing system 302, the firmware tool 310 determines whether the digital signature of the signed binary file 110 can be verified, for example using a public encryption key associated with the developer of the firmware 106. If the digital signature of the signed binary file 110 cannot be verified, further execution of the firmware tool 310 is blocked.

If the digital signature of the binary file 110 can be verified, the firmware tool 310 compares the firmware GUID 112A stored in the FETR table 306B to the firmware GUID 112B stored in the FIDT table 306A. If the firmware GUIDs 112 do not match, further execution of the firmware tool 310 is blocked. If the firmware GUIDs 112 match, the firmware tool 310 determines whether its tool GUID 114B matches at least one of the tool GUIDs 114A stored in the FETR table 306B. If the tool GUID 114B of the firmware tool 310 does not match a tool GUID 114A stored in the FETR table 306B, further execution of the firmware tool 310 is blocked. If the tool GUID 114B of the firmware tool 310 matches a tool GUID 114A stored in the FETR table 306B, the firmware tool 310 is permitted to execute.

The mechanism described above can also be utilized to limit execution of certain features of the firmware tool 310 to a particular platform. In order to provide this functionality, the firmware tool 310 can also identify feature GUIDs 116A stored in the FETR table 306B that match feature GUIDs 116B corresponding to features provided by the firmware tool 310. Only those features having a feature GUID 116B corresponding to a feature GUID 116A in the FETR table 306B will be enabled. All other features of the firmware tool 310 will be disabled. Additional details regarding this process will be provided below with regard to FIGS. 4A and 4B.

Figure 4A:
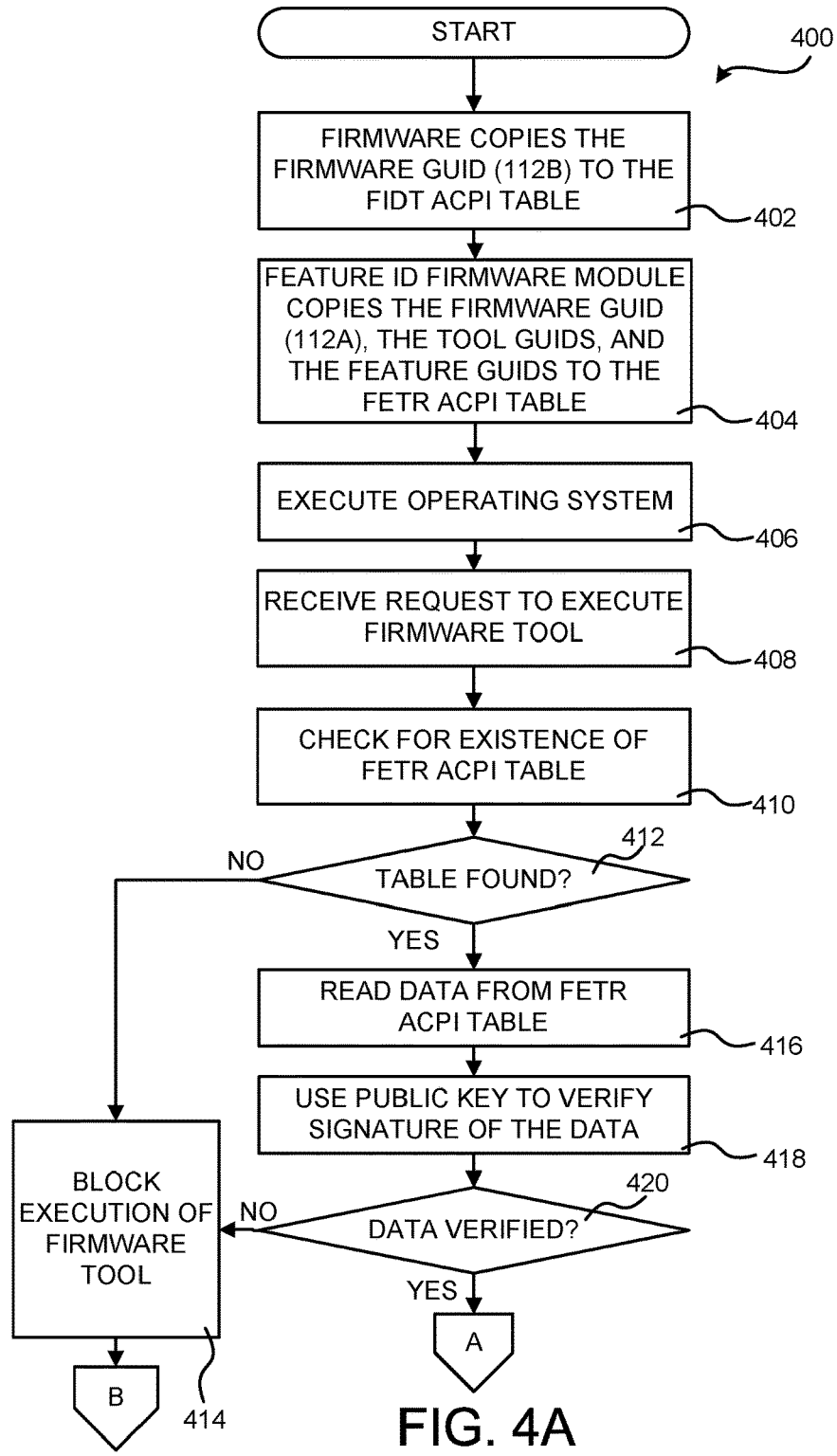
FIGS. 4A and 4B are flow diagrams showing a routine that illustrates aspects of the mechanism shown in FIG. 3 for restricting the use of firmware tools, and specific features provided by the firmware tools, to specific platforms, according to one or more configurations presented herein.
Figure 4B:
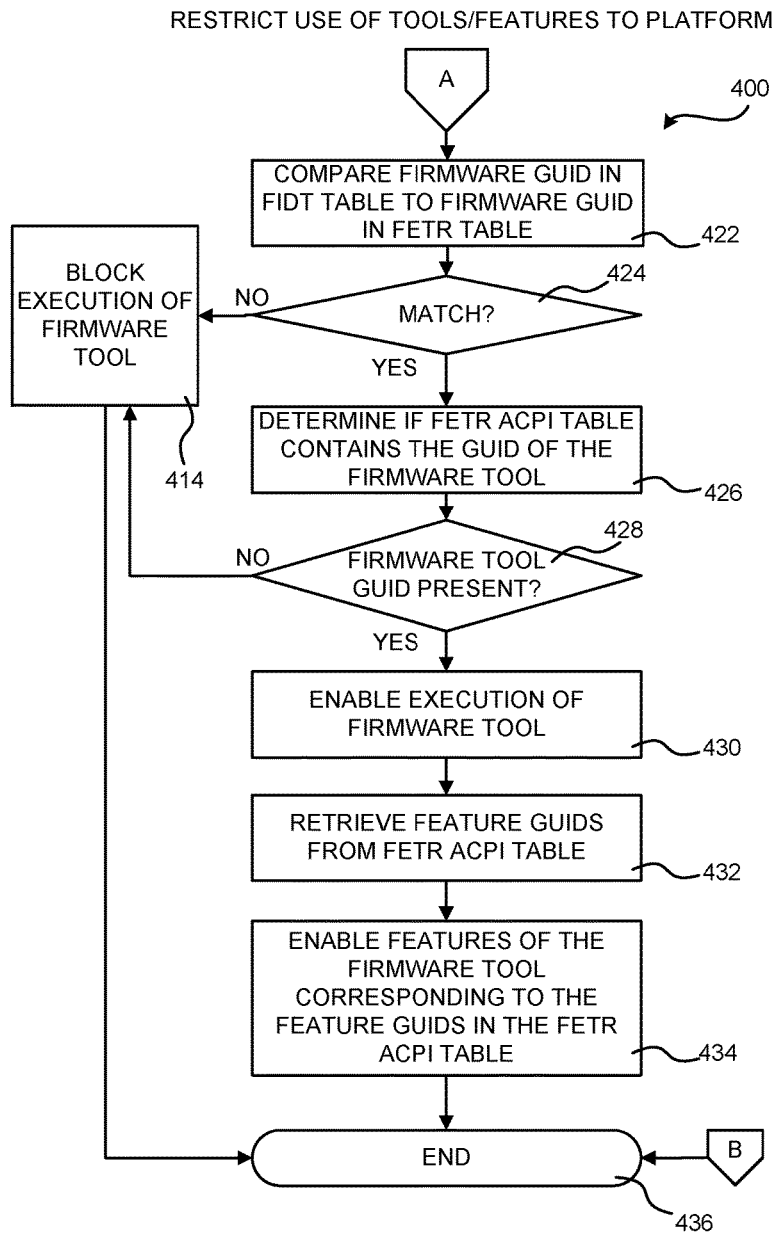

FIGS. 4A and 4B are flow diagrams showing a routine 400 that illustrates aspects of the mechanism shown in FIG. 3 for restricting the use of firmware tools 310, and specific features provided by the firmware tools 310, to specific platforms, according to one or more configurations presented herein. The routine 400 begins at operation 402, where the firmware 106 copies the firmware GUID 112B to the ACPI table 306A. The routine 400 then proceeds to operation 404, where the feature ID firmware module 108 copies the firmware GUID 112A, the tool GUIDs 114A, and the feature GUIDs 116A to the ACPI table 306B. The routine 400 then proceeds from operation 404 to operation 406.

Once the firmware 106 has completed its execution and the computing system 302 is ready to be booted, the operating system 308 can be executed. This occurs at operation 406. The routine 400 then proceeds to operation 408, where a request is received to execute a firmware tool 310, such as a user selecting the firmware tool 310 in a GUI or issuing a request to execute the firmware tool 310 through a command line interface ("CLI"). In response to such a request, the routine 400 proceeds from operation 408 to operation 410, where the firmware tool 310 begins execution and checks for the existence of the ACPI table 306B in the RAM of the computing system 302. If the ACPI table 306B is not found in the RAM, the routine 400 proceeds from operation 412 to operation 414, where further execution of the firmware tool 301 is blocked. From operation 414, the routine 400 proceeds to operation 436 (shown in FIG. 3B), where it ends.

If, at operation 410, the firmware tool 310 determines that the ACPI table 306B is stored in the RAM of the computing system 302, the routine 400 proceeds from operation 412 to operation 416. At operation 416, the firmware tool 310 reads the data from the ACPI table 306B, including the firmware GUID 112B, the tool GUIDs 114A, and the feature GUIDs 116A. The routine 400 then proceeds from operation 416 to operation 418, where the firmware tool 310 attempts to verify the digital signature of the firmware GUID 112B, the tool GUIDs 114A, and the feature GUIDs 116A. This might be performed, for example, using the public encryption key of the software developer of the firmware 106.

If the digital signature of the data in the ACPI table 306B cannot be verified, the routine 400 proceeds from operation 420 to operation 414, where further execution of the firmware tool 310 is blocked. If, however, the digital signature can be verified, the routine 400 proceeds from operation 420 to operation 422. At operation 422, the firmware tool 310 compares the firmware GUID 112A in the ACPI table 306B to the firmware GUID 112B in the ACPI table 306A. If the GUIDs 112A and 112B do not match, the routine 400 proceeds from operation 424 to operation 414, where further execution of the firmware tool 310 is blocked. If the GUIDs 112A and 112B match, the routine 400 proceeds from operation 424 to operation 426.

At operation 426, the firmware tool 310 determines if the ACPI table 306B includes the tool GUID 114A for the firmware tool 310. If not, the routine 400 proceeds from operation 428 to operation 414, where further execution of the firmware tool 310 is blocked. If the ACPI table 306B includes the tool GUID 114A for the firmware tool 310, the routine 400 proceeds from operation 428 to 430, where the firmware tool 310 is permitted to execute.

As discussed above, the mechanism disclosed herein can also be utilized to limit certain features provided by the firmware tool 310. In this configuration, the firmware tool 310 retrieves the feature GUIDs 116A from the ACPI table 306B at operation 432. The routine 400 then proceeds from operation 432 to operation 434, where the firmware tool 310 enables features corresponding to the feature GUIDs 116B that match feature GUIDs 116A in the ACPI table 306B. The routine 400 then proceeds from operation 434 to operation 436, where it ends.

Figure 5:
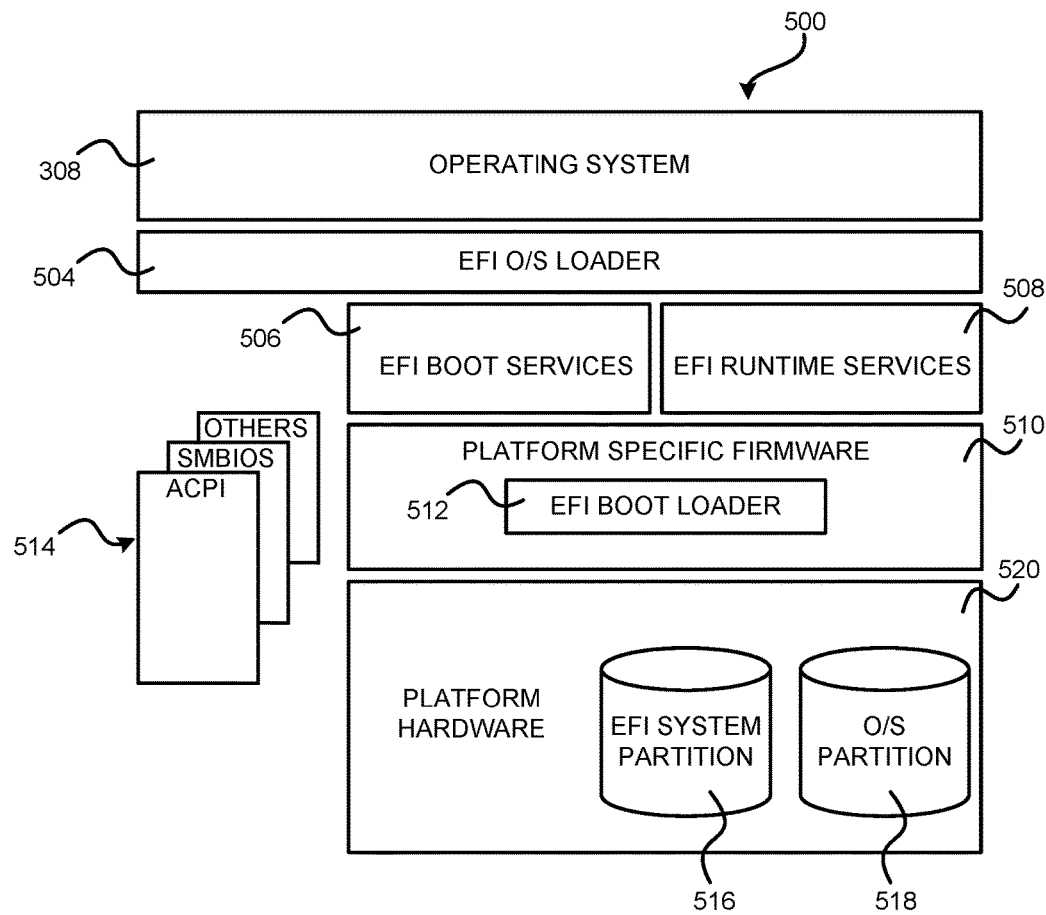
FIG. 5 is a software architecture diagram illustrating a software architecture for an extensible firmware interface ("EFI")-compliant firmware that provides an operating environment for the technologies presented herein in one particular configuration.

Turning now to FIG. 5, a software architecture diagram will be described that illustrates an architecture for a UEFI Specification-compliant firmware 500 that can be configured to provide and/or utilize aspects of the technologies disclosed herein. In particular, the firmware architecture shown in FIG. 5 can be utilized to implement the firmware 106 described above. As mentioned above, the firmware 106 can also be implemented in other ways in other configurations.

The UEFI Specification describes an interface between an operating system 308 and a UEFI Specification-compliant firmware. The UEFI Specification also defines an interface that a firmware can implement, and an interface that the operating system 308 can use while booting. How a firmware implements the interface can be left up to the manufacturer of the firmware. The UEFI Specification also defines a way for the operating system 308 and a firmware to exchange information necessary to support the operating system boot process. The term "UEFI Specification" used herein refers to both the EFI Specification developed by INTEL CORPORATION and the UEFI Specification managed by the UEFI FORUM, both of which are incorporated by reference herein in their entireties.

As shown in FIG. 5, the architecture can include platform hardware 520, such as that described below with regard to FIG. 6, and an operating system 308. A boot loader 512 for the operating system ("OS" or "O/S") can be retrieved from the UEFI system partition 516 using a UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 308. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the ACPI and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. UEFI allows extension of platform firmware by loading UEFI driver and UEFI application images which, when loaded, have access to UEFI-defined runtime and boot services.

Additional details regarding the operation and architecture of a UEFI Specification-compliant firmware can be found in the UEFI Specification which is available from the UEFI Forum. INTEL CORPORATION has also provided further details regarding recommended implementation of EFI and UEFI in the form of The INTEL Platform Innovation Framework for EFI ("the Framework"). Unlike the UEFI Specification, which focuses on programmatic interfaces for the interactions between the operating system 308 and system firmware, the Framework is a group of specifications that together describe a firmware implementation that has been designed to perform the full range of operations that are required to initialize a platform from power on through transfer of control to the operating system 308. The specifications that make up the Framework, which are also available from INTEL CORPORATION, are expressly incorporated herein by reference.

Figure 6:
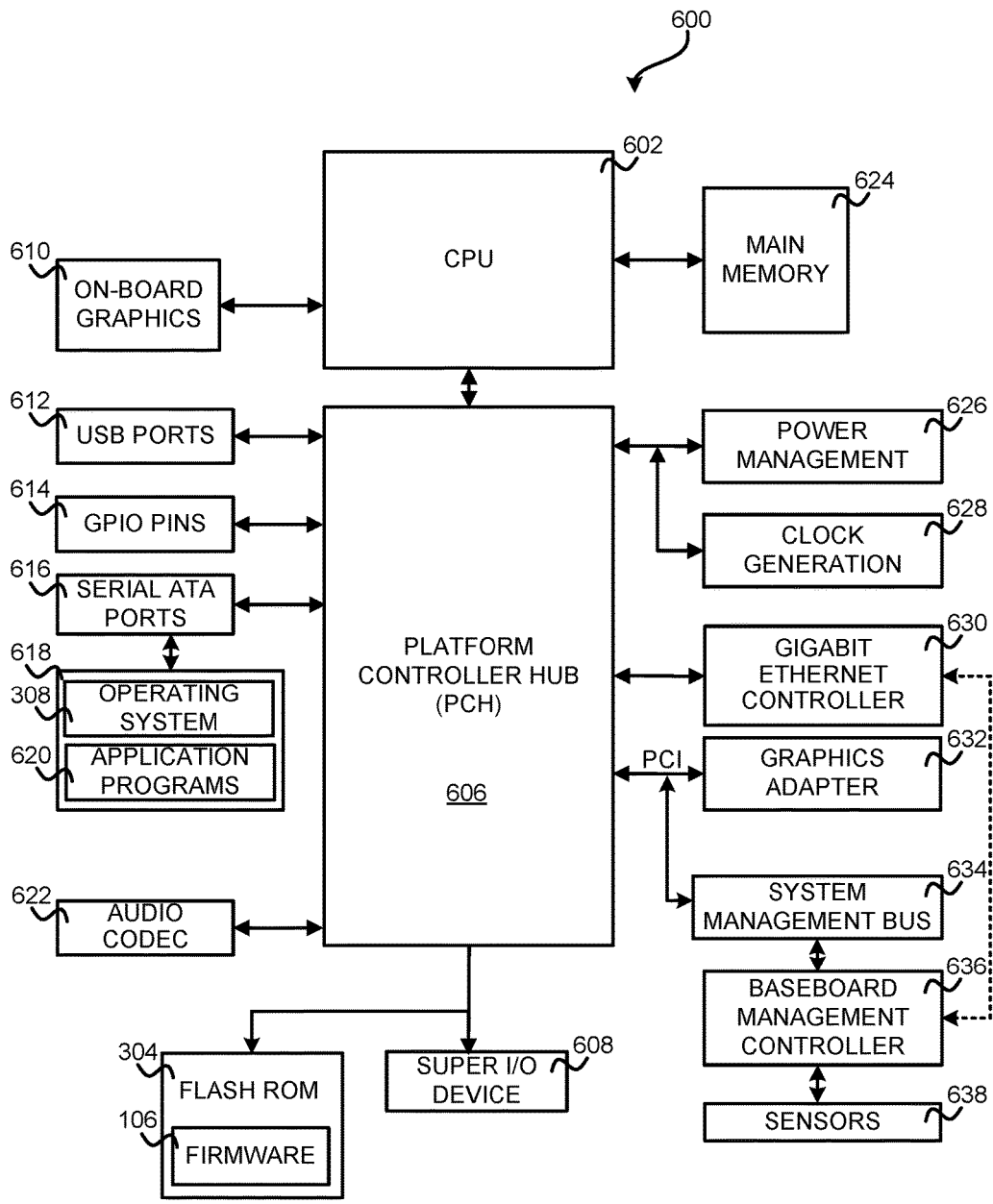
FIG. 6 is a computer architecture diagram that shows an illustrative architecture for a computer that can provide an operating environment for the technologies disclosed herein.

Referring now to FIG. 6, a computer architecture diagram that illustrates an illustrative architecture for a computer that can provide an illustrative operative environment for the technologies presented herein will be described. For example, and without limitation, the computer architecture shown in FIG. 6 can be utilized to implement the computing system 302, described above with regard to FIG. 3, and/or any of the other computing systems disclosed herein.

FIG. 6 and the following discussion are intended to provide a brief, general description of a suitable computing environment in which the configurations described herein can be implemented. While the technical details are presented herein in the general context of program modules that execute in conjunction with the execution of an operating system 308, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC' 97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to one configuration, the PCH 606 includes a serial advanced technology attachment ("SATA") adapter for providing one or more serial ATA ports 616. The serial ATA ports 616 can be connected to one or more mass storage devices storing an OS, such as OS 308 and application programs (like the firmware tool 310), such as a SATA disk drive 618. As known to those skilled in the art, an OS 308 comprises a set of programs that control operations of a computer and allocation of resources. An application program is software that runs on top of the operating system 308, or other runtime environment, and uses computer resources to perform application specific tasks desired by the user.

According to one configuration, the OS 308 comprises the LINUX operating system. According to another configuration, the OS 308 comprises the WINDOWS operating system from MICROSOFT CORPORATION. According to another configuration, the OS 308 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a flash ROM 304 for storing firmware 604 that includes program code containing the basic routines that help to start up the computer 600 and to transfer information between elements within the computer 600.

It should be appreciated that the program modules disclosed herein, including the firmware 106, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or flash ROM 304. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for restricting the use of firmware tools, and specific features provided by the firmware tools, to specific platforms have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
   receiving a request at a computing system to execute a firmware tool;
   responsive to the request, determining if a first Advanced Configuration and Power Interface (ACPI) table is stored in a memory of the computing system;
   responsive to determining that the first ACPI table is stored in a memory of the computing system,
   reading a first firmware globally unique identifier (GUID), one or more first firmware tool GUIDs, and one or more first feature GUIDs from the first ACPI table, and
   verifying a digital signature associated with the first firmware GUID, the one or more first firmware tool GUIDs, and the one or more first feature GUIDs;
   responsive to verifying the digital signature,
   reading a second firmware GUID from a second ACPI table stored in the memory of the computing system, and
   determining if the first firmware GUID is the same as the second firmware GUID;
   responsive to determining that the first firmware GUID is the same as the second firmware GUID, determining if a second firmware tool GUID is the same as at least one of the one or more first firmware tool GUIDs; and
   enabling execution of the firmware tool responsive to determining that the second firmware tool GUID is the same as at least one of the one or more first firmware tool GUIDs, wherein the at least one of the one or more first firmware tool GUIDs is associated with the firmware tool.

2. The computer-implemented method of claim 1, further comprising:
   determining whether a second feature GUID is the same as at least one of the one or more first feature GUIDs; and
   responsive to determining that the second feature GUID is the same as at least one of the one or more first feature GUIDs, enabling a feature of the firmware tool associated with the second feature GUID.

3. The computer-implemented method of claim 2, further comprising disabling the feature of the firmware tool associated with the second feature GUID responsive to determining that the second feature GUID is not the same as at least one of the one or more first feature GUIDs.

4. The computer-implemented method of claim 1, further comprising blocking execution of the firmware tool responsive to determining that the first ACPI table is not stored in the memory of the computing system.

5. The computer-implemented method of claim 1, further comprising blocking execution of the firmware tool responsive to determining that the digital signature is not verified.

6. The computer-implemented method of claim 1, further comprising blocking execution of the firmware tool responsive to determining that the first firmware GUID is not the same as the second firmware GUID.

7. The computer-implemented method of claim 1, further comprising blocking execution of the firmware tool responsive to determining that the second firmware tool GUID is not the same as at least one of the one or more first firmware tool GUIDs.

8. A non-transitory computer-readable storage medium storing computer-executable instructions which, when executed by a computer, cause the computer to:
   receive a request at a computing system to execute a firmware tool;
   responsive to the request, determine if a first Advanced Configuration and Power Interface (ACPI) table is stored in a memory of the computing system;
   responsive to determining that the first ACPI table is stored in a memory of the computing system,
   read a first firmware globally unique identifier (GUID), one or more first firmware tool GUIDs, and one or more first feature GUIDs from the first ACPI table, and
   verify a digital signature associated with the first firmware GUID, the one or more first firmware tool GUIDs, and the one or more first feature GUIDs;
   responsive to verifying the digital signature,
   read a second firmware GUID from a second ACPI table stored in the memory of the computing system, and
   determine if the first firmware GUID is the same as the second firmware GUID;
   responsive to determining that the first firmware GUID is the same as the second firmware GUID, determine if a second firmware tool GUID is the same as at least one of the one or more first firmware tool GUIDs; and
   enable execution of the firmware tool responsive to determining that the second firmware tool GUID is the same as at least one of the one or more first firmware tool GUIDs, wherein the at least one of the one or more first firmware tool GUIDs is associated with the firmware tool.

9. The non-transitory computer-readable storage medium of claim 8 storing further computer-executable instructions:
   determine whether a second feature GUID is the same as at least one of the one or more first feature GUIDs; and
   responsive to determining that the second feature GUID is the same as at least one of the one or more first feature GUIDs, enable a feature of the firmware tool associated with the second feature GUID.

10. The non-transitory computer-readable storage medium of claim 9 storing further computer-executable instructions to disable the feature of the firmware tool associated with the second feature GUID responsive to determining that the second feature GUID is not the same as at least one of the one or more first feature GUIDs.

11. The non-transitory computer-readable storage medium of claim 8 storing further computer-executable instructions to block execution of the firmware tool responsive to determining that the first ACPI table is not stored in the memory of the computing system.

12. The non-transitory computer-readable storage medium of claim 8 storing further computer-executable instructions to block execution of the firmware tool responsive to determining that the digital signature is not verified.

13. The non-transitory computer-readable storage medium of claim 8 storing further computer-executable instructions to block execution of the firmware tool responsive to determining that the first firmware GUID is not the same as the second firmware GUID.

14. The non-transitory computer-readable storage medium of claim 8, storing further computer-executable instructions to block execution of the firmware tool responsive to determining that the second firmware tool GUID is not the same as at least one of the one or more first firmware tool GUIDs.

15. A system, comprising:
one or more processors; and
at least one non-transitory computer-readable storage medium storing computer-executable instructions which, when executed by the one or more processors, cause the system to:
receive a request at a computing system to execute a firmware tool;
responsive to the request, determine if a first Advanced Configuration and Power Interface (ACPI) table is stored in a memory of the computing system;
responsive to determining that the first ACPI table is stored in a memory of the computing system,
read a first firmware globally unique identifier (GUID), one or more first firmware tool GUIDs, and one or more first feature GUIDs from the first ACPI table, and
verify a digital signature associated with the first firmware GUID, the one or more first firmware tool GUIDs, and the one or more first feature GUIDs;
responsive to verifying the digital signature,
read a second firmware GUID from a second ACPI table stored in the memory of the computing system, and
determine if the first firmware GUID is the same as the second firmware GUID;
responsive to determining that the first firmware GUID is the same as the second firmware GUID, determine if a second firmware tool GUID is the same as at least one of the one or more first firmware tool GUIDs; and
enable execution of the firmware tool responsive to determining that the second firmware tool GUID is the same as at least one of the one or more first firmware tool GUIDs, wherein the at least one of the one or more first firmware tool GUIDs is associated with the firmware tool.

16. The system of claim 15, wherein the at least one non-transitory computer-readable storage medium stores further computer-executable instructions to:
determine whether a second feature GUID is the same as at least one of the one or more first feature GUIDs; and
responsive to determining that the second feature GUID is the same as at least one of the one or more first feature GUIDs, enable a feature of the firmware tool associated with the second feature GUID.

17. The non-transitory computer-readable storage medium of claim 16, wherein the at least one non-transitory computer-readable storage medium stores further computer-executable instructions to disable the feature of the firmware tool associated with the second feature GUID responsive to determining that the second feature GUID is not the same as at least one of the one or more first feature GUIDs.

18. The non-transitory computer-readable storage medium of claim 15, wherein the at least one non-transitory computer-readable storage medium stores further computer-executable instructions to block execution of the firmware tool responsive to determining that the first ACPI table is not stored in the memory of the computing system.

19. The non-transitory computer-readable storage medium of claim 15, wherein the at least one non-transitory computer-readable storage medium stores further computer-executable instructions to block execution of the firmware tool responsive to determining that the digital signature is not verified.

20. The non-transitory computer-readable storage medium of claim 15, wherein the at least one non-transitory computer-readable storage medium stores further computer-executable instructions to block execution of the firmware tool responsive to determining that the first firmware GUID is not the same as the second firmware GUID or in response to determining that the second firmware tool GUID is not the same as at least one of the one or more first firmware tool GUIDs.

* * * * *